United States Patent
Yamada et al.

(10) Patent No.: US 6,787,595 B1
(45) Date of Patent: Sep. 7, 2004

(54) RUBBER COMPOSITION AND TIRE

(75) Inventors: Hiroshi Yamada, Tokyo (JP); Yuichiro Nakamura, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/695,317

(22) Filed: Oct. 25, 2000

(30) Foreign Application Priority Data

Oct. 26, 1999 (JP) .......................................... 11-303348
Jan. 14, 2000 (JP) ...................................... 2000-006809

(51) Int. Cl.$^7$ ................................................. C08K 3/04
(52) U.S. Cl. ...................................... 524/495; 152/450
(58) Field of Search .......................... 152/450; 524/191, 524/192, 198, 495

(56) References Cited

U.S. PATENT DOCUMENTS 6,380,288 B1 * 4/2002 Hojo et al. .................. 152/450

FOREIGN PATENT DOCUMENTS

| EP | 478274 A1 | * 4/1992 | ........... H04L/12/24 |
| EP | 0 478 274 A1 | 4/1992 | ........... C08K/5/25 |
| JP | 62-277443 | 12/1987 | ............. C08L/7/00 |
| JP | 1-275643 | 11/1989 | ............. C08L/7/00 |
| JP | 10-28772 | * 10/1998 | ........... C08L/21/00 |
| JP | 10-287769 | 10/1998 | ............. C08L/7/00 |
| JP | 10-287772 | 10/1998 | ........... C08L/21/00 |

* cited by examiner

*Primary Examiner*—Robert D. Harlan
(74) *Attorney, Agent, or Firm*—Sughrue Mion, PLLC

(57) ABSTRACT

A first object of the present invention is to provide a rubber composition which improves both wear resistance and low heat-buildup property, and a second object is to provide a tire in which low heat-buildup property (low fuel consumption) and tear resistance are improved without impairing wear resistance. In order to achieve the first object, a first aspect of the present invention is a rubber composition comprising a rubber component selected from at least one of natural rubber and a diene-based synthetic rubber, and a carbon black. The carbon black has a dibutyl phthalate absorption amount (DBP) of 140 to 200 ml/ 100 g. An aggregate of the carbon black has a ratio (Dw/Dn) of weight average diameter (Dw) to number average diameter (Dn) of 1.80 to 2.40, and the carbon black has a specific tinting strength (Tint) satisfying an inequality: Tint $\geq 0.100\times$ nitrogen absorption specific surface area ($N_2SA$)+93. In order to achieve the second object, a second aspect of the present invention is a tire which has at least a tread, and the tread is made of the rubber composition of the first aspect of the invention.

13 Claims, No Drawings

RUBBER COMPOSITION AND TIRE

BACKGROUND OF THE INVENTION

1. Field of the Invention

The present invention relates to a rubber composition which can improve both wear resistance and low heat-buildup property, which are properties antinomic to each other, and can be suitably used in various fields such as treads for tires, and to a tire in which low heat-buildup property (low fuel consumption) and tear resistance are improved without impairing wear resistance.

2. Description of the Related Art

Rubber compositions have been suitably used in various fields such as treads for tires and the like. When a rubber composition is used for a tread for a tire, it is desirable that the rubber composition is good in both wear resistance and low heat-buildup property, which are the properties antinomic to each other. In the prior art, carbon black having a high dibutyl phthalate absorption amount (DBP) was compounded to a rubber composition to improve wear resistance thereof. In this case, however, there was a drawback in that if the DBP was too large, wear resistance deteriorated and low heat-buildup property could not be sufficiently improved. A rubber composition which can simultaneously improve both wear resistance and low heat-buildup property, which are the properties antinomic to each other, and can improve these properties in a well balanced manner, has not been provided previously.

It is a first object of the present invention to provide a rubber composition which can improve both wear resistance and low heat-buildup property, which are properties antinomic to each other, can improve these properties in a well balanced manner, and can be suitably used in various fields such as treads for tires.

Further, it is desirable if a tread for a tire is good in both wear resistance and low heat-buildup property (low fuel consumption), which are the properties antinomic to each other. In the prior art, a compounding amount of carbon black was decreased to lower the heat-buildup property of a rubber composition which is used for a tread. In this case, however, a drawback arose in that wear resistance deteriorated. On the other hand, carbon black having a large DBP value was added to a rubber composition which was used for a tread for a tire so that wear resistance thereof was improved. In this case, however, there was a drawback in that if the DBP value was too large, wear resistance deteriorated and low heat-buildup property could not be sufficiently improved. In a case in which wear resistance was improved, although the life of a tire was extended, there was a drawback in that tears and the like were formed in the tire before a rubber composition was completely worn and thus the tire could not be used till the end of its expected life.

It is a second object of the present invention to provide a tire in which low heat-buildup property (low fuel consumption) and tear resistance are improved without impairing wear resistance.

SUMMARY OF THE INVENTION

Properties of a rubber composition are greatly influenced by interactions, such as physical bonding and chemical bonding, between a rubber component and carbon black which are compounded in the rubber composition. Carbon black is present in a rubber composition in the form of an aggregate dispersed therein. The present inventor has found that wear resistance and low heat-buildup property, which are the properties antinomic to each other, can be improved in a well balanced manner by improving dispersion of carbon black in a rubber composition, which can be done by controlling the form of the aggregate and the surface activity of the carbon black. Further, the present inventor has also found that even tear resistance can be improved by adding a hydrazide-based compound to the rubber composition.

The first aspect of the present invention for achieving the first object is a rubber composition comprising: at least one rubber component selected from natural rubber and a diene-based synthetic rubber; and a carbon black, wherein the carbon black has a dibutyl phthalate absorption amount (DBP) of 140 to 200 ml/100 g, an aggregate of the carbon black has a ratio (Dw/Dn) of a weight average diameter (Dw) to a number average diameter (Dn) of 1.80 to 2.40, and the carbon black has a specific tinting strength (Tint) and a nitrogen absorption specific surface area ($N_2SA$) satisfying an inequality: Tint $\geq 0.100 \times (N_2SA) + 93$.

The second aspect of the present invention for achieving the second object is a tire which has at least a tread, wherein the tread is formed of the rubber composition in accordance with the first aspect of the present invention.

DESCRIPTION OF THE PREFERRED EMBODIMENTS

The rubber composition in accordance with the first aspect of the present invention contains at least a rubber component and a carbon black, and other components appropriately selected in accordance with requirements.

Rubber Component

The rubber component includes at least one of natural rubber and a diene-based synthetic rubber, and other components appropriately selected in accordance with requirements.

The diene-based synthetic rubber is not particularly limited and can be selected from well-known diene-based synthetic rubbers in accordance with objectives. Examples of the diene-based synthetic rubber include a styrene-butadiene copolymer, a styrene-isoprene copolymer, polyisoprene, polybutadiene, and the like. One type of diene-based synthetic rubber may be used alone, or two types or more may be used in combination.

Among these diene-based synthetic rubbers, polybutadiene is preferable. Cis-1,4-polybutadiene is preferable in terms of low glass transition temperature. Polybutadiene having a cis content of 90% or more is especially preferable.

In the present invention, natural rubber and the diene-based synthetic rubber are preferably used in combination since such a combination can achieve both low heat-buildup property and high wear resistance. In this case, a weight ratio of the natural rubber to the diene-based synthetic rubber (natural rubber/diene-based synthetic rubber) is preferably 0 to 50 parts by weight per 100 parts by weight of rubber component. When the compounding amount of the natural rubber in the rubber component is not less than 50% by weight, fracture properties of vulcanized rubber composition is good, and durability of the tire whose tread is made of the rubber composition is good.

Carbon Black

A carbon black used in the present invention has dibutyl phthalate absorption amount (DBP), a ratio (Dw/Dn) of weight average diameter (Dw) to number average diameter (Dn) of an aggregate, and specific tinting strength (Tint) as described below.

The dibutyl phthalate absorption amount (DBP) (which hereinafter may be referred to as the "DBP absorption")

must be in a range of 140 to 200 ml/100 g, and is preferably in a range of 140 to 180 ml/100 g.

When the DBP absorption is not less than 140 ml/100 g, the wear resistance is sufficient. When the DBP absorption is not more than 200 ml/100 g, processing characteristics and elongation characteristics are good, and general characteristics as a rubber composition is good. Moreover, the heat-buildup property can be maintained at a low level.

The DBP absorption is a value measured in accordance with rule A of Japanese Industrial Standard (JIS) K6221 (1982) 6.1.2 and refers to the amount of dibutyl phthalate (ml) that is absorbed by 100 g of carbon black.

The ratio (Dw/Dn) of the weight average diameter (Dw) to the number average diameter (Dn) of the aggregate must be in a range of 1.80 to 2.40, and is preferably in a range of 1.80 to 2.30.

When the ratio (Dw/Dn) is not less than 1.80, the heat-buildup property can be maintained at a low level. When the ratio to (Dw/Dn) is not more than 2.40, the wear resistance is good.

The "aggregate" described herein refers to a discrete, rigid colloidal entity that is the smallest dispersible unit and is composed of extensively coalesced particles. The weight average diameter (Dw) and the number average diameter (Dn) can be measured by using a well-known measuring device such as a disc centrifuge photosedimentmeter (DCP) (BI-DCP, manufactured by DCP Brookhaven Co., Ltd.).

The specific tinting strength (Tint) must satisfy the following condition: Tint $\geq 0.100\times$ nitrogen absorption specific surface area $(N_2SA)+93$.

When the specific tinting strength (Tint) satisfies the above inequality, a reinforcing property and wear resistance are good.

The specific tinting strength (Tint) can be measured by a method which conforms to rule A of JIS 6221-1982.

Carbon black used in the present invention is not particularly limited, provided that the DBP absorption, the above ratio (Dw/Dn) and the specific tinting strength (Tint) respectively fall within the above-mentioned numerical ranges. However, it is suitable if the carbon black used has a nitrogen absorption specific surface area $(N_2SA)$, a ratio $(N_2SA/IA)$ of the nitrogen absorption specific surface area $(N_2SA)$ to an iodine absorption (IA), and a ratio $(\Delta D_{50}/Dst)$ of a half-width $(\Delta D_{50})$ to a mode (Dst) of the aggregate as described below.

The nitrogen absorption specific surface area $(N_2SA)$ is preferably in a range of 100 to 180 m$^2$/g, more preferably in a range of 100 to 170 m$^2$/g, and most preferably in a range of 100 to 150 m$^2$/g.

When the nitrogen absorption specific surface area $(N_2SA)$ is not less than 100 m$^2$/g, the wear resistance of the resulting vulcanized rubber composition is good. When the nitrogen absorption specific surface area $(N_2SA)$ is not more than 180 m$^2$/g, dispersion of the carbon black in the rubber composition is good, and the wear resistance of the vulcanized rubber composition is good. It is beneficial if the nitrogen absorption specific surface area $(N_2SA)$ falls within the above numerical range, in that the wear resistance of the rubber composition can be satisfactorily improved.

The nitrogen absorption specific surface area $(N_2SA)$ is stipulated in ASTM D3037-88 and refers to the nitrogen absorption specific surface area per unit weight (m$^2$/g).

The ratio $(N_2SA/IA)$ of the nitrogen absorption specific surface area $(N_2SA)$ to the iodine absorption (IA) is preferably in a range of 0.70 to 1.00, and more preferably in a range of 0.80 to 1.00.

When the above ratio $(N_2SA/IA)$ is not less than 0.70, the low heat-buildup property is assured. When the ratio $(N_2SA/IA)$ is not more than 1.00, the wear resistance is maintained. It is beneficial if the ratio falls within the above-mentioned numerical range, in that both the wear resistance and the low heat-buildup property can be improved.

The iodine absorption (IA) is stipulated in JIS K6221-1982 and refers to iodine absorption per unit weight (mg/g).

The ratio $(\Delta D_{50}/Dst)$ of the half-width $(\Delta D_{50})$ of the aggregate to the mode (Dst) of the aggregate is preferably in a range of 1.05 to 2.50, and more preferably in a range of 1.10 to 2.30.

When the above ratio $(\Delta D_{50}/Dst)$ is not less than 1.05, the low heat-buildup property is good. When the ratio $(\Delta D_{50}/Dst)$ is not more than 2.50, the wear resistance is maintained. When the ratio falls within the above range of values, the wear resistance can be improved without detracting from the low heat-buildup property of the vulcanized rubber composition. This is beneficial in that both the mutually conflicting properties of wear resistance and low heat-buildup property can be improved.

The aggregate of the carbon black are analyzed by centrifugal sedimentation. The "mode (Dst)" refers to a modal diameter value, i.e., the most frequent value (Dst), on a distribution curve of Stokes equivalent diameters. The "half-width $(\Delta D_{50})$" refers to a half-width $(\Delta D_{50})$ of the peak in the distribution curve with respect to the mode (Dst).

By using, for example, a disc centrifuge photosedimentmeter (DCP), these values can be measured as follows.

A small amount of a surfactant is added to a 20% by volume aqueous solution of ethanol. Then, carbon black is added in an amount of 50 mg/l and is completely dispersed by an ultrasound treatment. Ten ml of distilled water serving as a sedimentation solution (a spinning solution) and 1 ml of a buffer solution (i.e., the 20% by volume aqueous solution of ethanol) are sequentially added to a rotary disc whose speed is set to be 8000 rpm. By using an injector, 0.5 ml of the above dispersion of the carbon black is added to the rotary disc, and then centrifugal sedimentation is started. A distribution curve of the aggregate is prepared by a photoelectric sedimentation method.

In view of the above measuring operation, the mode (Dst) and half-width $(\Delta D_{50})$ will now be described in more detail. The mode (Dst) is defined to be, in the curve of Stokes equivalent diameters of the aggregate that is obtained by the above measuring operation, the Stokes equivalent diameter which is the most frequent (actually, the diameter having the largest light absorbance, because optical measurements are carried out). The mode (Dst) is considered to be a value representing an average size of the carbon black aggregate.

Further, the half-width $(\Delta D_{50})$ of the aggregate is the absolute value of a difference between a larger Stokes equivalent diameter and a smaller Stokes equivalent diameter, at each of which the frequency is 50% of the frequency at the mode diameter (Dst). Namely, the half-width $(\Delta D_{50})$ is the difference between a larger Stokes equivalent diameter and a smaller Stokes equivalent diameter which have values ½ of the value at the mode (Dst).

As a carbon black, carbon blacks of HAF grade to SAF grade that satisfy the various conditions described above can be preferably used in the present invention. Carbon blacks of HAF grade or higher grades are beneficial in that the wear resistance of the resulting vulcanized rubber composition can be sufficiently improved.

The above-described carbon black can be prepared by using, for example, a carbon black preparing furnace as shown in FIG. 1 of Japanese Patent Application Laid-Open (JP-A) No. 4-264165. That is, the carbon black preparing furnace includes an inflammable fluid introducing chamber (inner diameter: 450 mm, length: 400 mm), a convergence chamber (inner diameter at the upstream end: 370 mm, diameter at the downstream end: 80 mm, angle of convergence: 5.3°), a stock oil introducing chamber, a reaction chamber, and a reaction continuing and cooling chamber (inner diameter: 140 mm, length: 2000 mm). The inflammable fluid introducing chamber includes a cylinder for introducing an oxygen-containing gas (inner diameter: 250 mm, length: 300 mm). This cylinder has a straightening vane for adjusting the flow of the oxygen-containing gas, which is introduced from a periphery of a top portion of the furnace, and a fuel introducing device at the central axis of the cylinder. The convergence chamber is disposed at the downstream side of the cylinder. The stock oil introducing chamber is disposed at the downstream side of the convergence chamber, and includes a stock oil spray assembly device which is formed by four separate planes each having four stock oil sprayers thereon. Disposed at the downstream side of the stock oil introducing chamber are the reaction chamber and the reaction continuing and cooling chamber. The reaction continuing and cooling chamber includes a spraying device which sprays pressurized quenching water for stopping the reaction. The entire preparing furnace is covered with fireproof material.

One type of the above-described carbon blacks may be used alone, or two types or more may be used in combination.

The compounding amount of carbon black is preferably in a range of 30 to 70 parts by weight, and more preferably in a range of 40 to 55 parts by weight per 100 parts by weight of the rubber component.

When the compounding amount of carbon black is in the range of 30 to 70 parts by weight, a rubber composition is formed in which general characteristics such as strength and the like are satisfactory and in which wear resistance and low heat-buildup property are excellent. When the compounding amount of carbon black falls within the range of 40 to 55 parts by weight, a rubber composition is formed in which general characteristics such as strength and the like are excellent and in which wear resistance and low heat-buildup property are particularly excellent.

Other Components

Other components can appropriately be selected and used as long as they do not have adverse effects with respect to the present invention. Examples of other components which can be used include an inorganic filler, a softening agent, a vulcanizing agent such as sulfur and the like; a vulcanizing accelerator such as dibenzothiazyldisulfide; a vulcanization assistant; an age resistor such as N-cyclohexyl-2-benzothiazyl-sulfenamide, N-oxydiethylene-benzothiazyl-sulfenamide and the like; additives such as zinc oxide, stearic acid, an anti-ozone-deteriorative agent, a colorant, an antistatic agent, a lubricant, an antioxidant, a softening agent, a coupling agent, a foaming agent, a foaming assistant and the like; and various compounding agents generally used in the rubber industry. Commercial products of these components can be suitably used.

The rubber composition may contain a hydrazide-based compound as other component. The hydrazide-based compound has functions of reducing reactivity of the rubber component, maintaining and improving reactivity of the carbon black, and suppressing an increase in viscosity while maintaining a good low heat-buildup property of the vulcanized rubber composition.

The hydrazide-based compound is not particularly limited as long as it has the above functions, and can be appropriately selected in accordance with objectives. However, hydrazide-based compounds represented by the following formulae (I) to (III) are preferable.

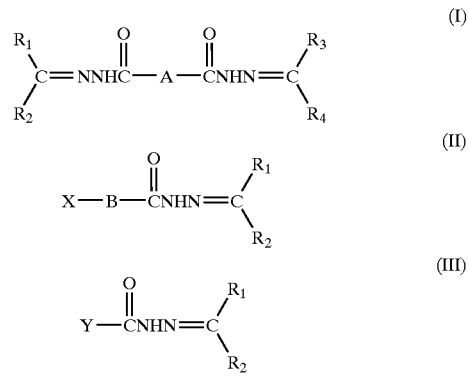

In the above formulae (I) to (III), A represents a divalent aromatic ring group (connecting at either the ortho-position, the meta-position, or the para-position), a hydantoin ring group, or a saturated or unsaturated, straight or branched aliphatic hydrocarbon group having 0 to 18 carbon atoms (an ethylene group, a tetramethylene group, a heptamethylene group, an octamethylene group, an octadecamethylene group, a 7,11-octadecadienilene group, or the like). B represents an aromatic group (a phenyl group, a naphthyl group, or the like). X represents a hydroxyl group or an amino group. Y represents a pyridyl group or a hydrazino group. $R_1$ to $R_4$ represent a hydrogen atom, an alkyl group having 1 to 18 carbon atoms, a cycloalkyl group having 3 to 10 carbon atoms, and an aromatic ring. $R_1$ to $R_4$ may be the same as to or different from one another.

Examples of the hydrazide-based compound represented by formula (I) include isophthalic acid dihydrazide, isophthalic acid di(1-methylethylidene) hydrazide which is a derivative of adipic acid hydrazide, adipic acid di(1-methylethylidene) hydrazide, isophthalic acid di(1-methylpropylidene) hydrazide, adipic acid di(1-methypropylidene) hydrazide, isophthalic acid di(1,3-dimethylpropylidene) hydrazide, adipic acid di(1,3-dimethylpropylidene) hidrazide, isophthalic acid di(1-phenylethylidene) hydrazide, adipic acid di(1-phenylethylidene) hydrazide, derivatives of terephthalic acid dihydrazide, azelaic acid dihydrazide, succinic acid dihydrazide, icosanoic dicarboxylic acid dihydrazide, and the like.

Among these compounds, because of excellent effect in improving low heat-buildup property of the vulcanized rubber composition and reducing Mooney viscosity, derivatives of isophthalic acid dihydrazide, which can reduce the Mooney viscosity of the vulcanized rubber composition while maintaining low heat-buildup property of the vulcanized rubber composition, are preferable.

Examples of the hydrazide-based compound represented by formula (II) include derivatives of 2-naphthoic acid-3-hydroxyhydrazide such as 3-hydroxy, (1-methylethylidene)-2-naphthoic acid hydrazide, 3-hydroxy, (1-methylpropylidene)-2-naphthoic acid hydrazide, 3-hydroxy, (1,3-dimethylpropylidene)-2-naphthoic acid hydrazide, and 3-hydroxy, (1-phenylethylidene)-2-naphthoic acid hydrazide; derivatives of salicylic acid hydrazide; derivaties of 4-hydroxy benzoic acid hydrazide; derivatives of anthranilic acid hydrazide; and derivatives of 1-hydroxy-2-naphthoic acid hydrazide.

Among these compounds, derivatives of 2-naphthoic acid-3-hydroxyhydrazide are preferable since they can suppress Mooney viscosity of the vulcanized rubber composition to a small value while maintaining excellent low heat-buildup property. 3-hydroxy, N'-(1,3-dimethylbutylidene)-2-naphthoic acid hydrazide is particularly preferable in that such an effect is remarkable.

Examples of the hydrazide-based compound represented by formula (III) include derivatives of isonicotinic acid hydrazide such as isonicotinic acid (1-methylethylidene) hydrazide, isonicotinic acid (1-methylpropylidene) hydrazide, isonicotinic acid (1,3-dimethylpropylidene) hydrazide, and isonicotinic acid (1-phenylethylidene) hydrazide; derivatives of carbonic acid hydrazide, and the like.

Among these compounds, derivatives of isonicotinic acid hydrazide are preferable since they can reduce Mooney viscosity of the vulcanized rubber composition while maintaining excellent low heat-buildup property of the vulcanized rubber composition.

Regarding the hydrazide-based compounds represented by formulae (I) to (III), one type may be used alone, or two or more types may be used in combination.

The hydrazide-based compounds represented by formulae (I) to (III) can be prepared on the basis of a method described in Pant, U. C.; Ramchandran, Reena; Joshi, B. C. Rev. Roum. Chim. (1979) 24(3), 471–82.

The content of the hydrazide-based compound in the rubber composition is preferably 0.5 to 2 parts by weight per 100 parts by weight of the rubber component.

When the hydrazide-based compound content is not less than 0.5 parts by weight, the effect of addition is satisfactory, and the tear resistance of the vulcanized rubber composition is sufficiently assured. When the content is not more than 2 parts by weight, the low heat-buildup property of the vulcanized rubber composition is maintained.

Preparation of the Rubber Composition

The rubber composition according to the first aspect of the present invention can be prepared by kneading and the like the rubber component, the carbon black, and the other components that have been appropriately selected in accordance with requirements, and then warming, extruding, vulcanizing the mixture.

Kneading conditions are not particularly limited. Various kneading conditions, such as volumes fed into the kneading apparatus, rotating speed of a rotor, ram pressure, kneading temperature, duration of kneading, the type of kneading apparatus and the like, can be appropriately selected in accordance with objectives.

Examples of the kneading apparatus include internal mixers such as Banbury mixers®, intermixers®, kneaders, and the like, which are conventionally used for kneading of rubber compositions.

Warming conditions are not particularly limited. Various warming conditions such as warming temperature, duration of warming, the warming apparatus and the like can be appropriately selected in accordance with objectives.

Examples of the warming apparatus include rollers that are used for warming ordinary rubber compositions.

Extruding conditions are not particularly limited. Various extruding conditions such as duration of extrusion, speed of extrusion, the extrusion apparatus, extrusion temperature and the like can be appropriately selected in accordance with objectives.

Examples of the extrusion apparatus include extrusion apparatuses used for extruding conventional rubber compositions for tires.

At the time of extrusion, a plasticizer such as an aromatic oil, a naphthene oil, a paraffin oil, an ester oil and the like, and processibility improving agents such as liquid polymers including liquid polyisoprene rubber, liquid polybutadiene rubber and the like can be appropriately added to the rubber composition in order to control the fluidity of the rubber composition. In this case, viscosity of the unvulcanized rubber composition may be decreased so that fluidity thereof can be increased. As a result, extrusion can be carried out in an excellent manner.

Apparatuses, methods and conditions for vulcanization are not particularly limited and can be appropriately selected in accordance with objectives.

Examples of the vulcanizing apparatus include vulcanizing machines using for forming molds, which are conventionally used for vulcanizing a tire.

Regarding conditions of vulcanization, the vulcanizing temperature is generally in a range of 100 to 190° C.

Although the rubber composition according to the first aspect of the present invention can be suitably used in various fields, the rubber composition can be preferably used in a rubber material where both good wear resistance and good low heat-buildup property need to be achieved, and can be particularly suitably used in a tread for a tire and the like. Further, the rubber composition of the present invention can also be used in a substitute tread for a retreaded tire, a solid tire, the ground-contacting portion of a rubber chain for icy road travel, a crawler of a snow vehicle, and the like.

The tire according to the second aspect of the present invention has at least a tread, and shape, structure, size, and the like of the tire are not particularly limited and can be appropriately selected in accordance with objectives as long as the tread is formed of the rubber composition of the first aspect of the invention.

An example of the tire is a tire which is formed by a pair of bead portions, a carcass which extends in a toroidal shape from one bead portion to another bead portion, a belt which hoops a crown portion of the carcass, and a tread.

The above tire may have a radial structure or a bias structure. Examples of gas to be charged into the tire include air, nitrogen, and the like.

The tread may have a single-layer structure or a multi-layered structure such as a cap-and-base structure in which the tread is formed by an uppermost cap portion which directly contacts a road surface and an underlying base portion which is disposed inner side of the cap portion.

In a case in which the tire has the cap and base structure, the cap portion may be formed of the rubber composition according to the first aspect of the invention, the base portion may be formed of the rubber composition of the first aspect of the invention, or both of the cap portion and the base portion may be formed of the rubber composition of the first aspect of the invention.

The tread is formed of the rubber composition according to the first aspect of the invention. The rubber composition may contain a hydrazide-based compound.

EXAMPLES

Examples of the present invention will be described hereinafter. The present invention is not limited to these Examples.

[Experiment I]

Examples 1 to 6 and Comparative Examples 1 to 4

Rubber compositions having the compositions shown in Table 1 were respectively vulcanized by using a vulcanizing apparatus (the vulcanizing temperature was 145° C. and the duration was 30 minutes).

Each of the rubber compositions further contained 2.0 parts by weight of stearic acid, 3.5 parts by weight of zinc white, 2.0 parts by weight of an age resistor (i.e., N-(1,3-dimethylbutyl)-N'-phenyl-p-phenylenediamine), 1.3 parts by weight of a vulcanization accelerator (i.e., N'-cyclohexyl-2-benzodiazothiazylsulfenamide), and 1.0 parts by weight of sulfur per 100 parts by weight of rubber component.

The characteristics of the carbon blacks used in the respective rubber compositions are given in Table 2.

In Table 2, "DBP" represents the above-mentioned dibutyl phthalate absorption amount (DBP), which was measured as described above. "Dw/Dn" represents the ratio (Dw/Dn) of the weight average diameter (Dw) to the number average diameter (Dn) of the aggregate, "Dw" represents the weight average diameter (Dw) of the aggregate, and "Dn" represents the number average diameter (Dn) of the aggregate. These values were determined using the disc centrifuge photosedimentmeter (BI-DCP). "TINT" represents the above-mentioned specific tinting strength (Tint), which was measured by a method conforming to rule A of JIS K6221-1982. "$N_2SA/IA$" represents the ratio ($N_2SA/IA$) of the nitrogen absorption specific surface area ($N_2SA$) to the iodine absorption (IA). These values were measured as described above. "$D_{50}/Dst$" represents the ratio ($\Delta D_{50}/Dst$) of the half-width ($\Delta D_{50}$) to the mode (Dst) of the aggregate. These values were measured as described above.

The wear resistance and the low heat-buildup property of the vulcanized rubber composition were evaluated as described below for the respective rubber compositions obtained after the vulcanization. The results are shown in Table 1.

[Experiment II]

Examples 7 to 9 and Reference Example

A tread for a pneumatic tire was formed by using each of rubber compositions shown in Table 3, and pneumatic tires for the respective tests were manufactured in accordance with the conventional pneumatic tire manufacturing conditions (the vulcanizing temperature was 145° C. and the duration was 30 minutes). Details of carbon blacks shown in Table 3 are given in Table 4. Further, the tire in Reference Example was manufactured in the same way as in Example 8 except that a rubber composition containing no hydrazide-based compound was used and that carbon black was replaced with "M" in Table 4.

Each of the pneumatic tires was a pneumatic radial tire for a passenger vehicle with a size of 185/70R13 and had a radial structure in which a pair of bead portions, a carcass which extends in a toroidal shape from one bead portion to another bead portion, a belt which hoops a crown portion of the carcass, and a tread are sequentially disposed. In each of the pneumatic tires, cords in the carcass ply were disposed at an angle of substantially 90° with respect to the circumferential direction of the pneumatic tire. The number of the embedded cords was 50/5 cm.

The following evaluation was carried out for the treads of the pneumatic tires obtained for the respective tests. The results are shown in Table 3.

Evaluation of Wear Resistance

A wear loss amount of each of the rubber compositions of Examples 1 to 6 was measured using a Lambourne wear tester and was calculated in accordance with the following equation: Wear resistance index={(volume loss of a test piece of the rubber composition of Comparative Example 1)/(volume loss of the current test piece)}×100.

Indices are shown with the wear resistance of the rubber composition of Comparative Example 1 being 100. That is, the higher the value, the better the wear resistance.

Each of the pneumatic tires manufactured in Examples 7 to 9 was mounted to a truck as a rear wheel, and the respective trucks traveled 10,000 kilometers. Subsequently, the depth of the groove of the tread was measured for each of the tires. A wear loss amount of each of the tires was calculated by subtracting the depth of the groove of the tread after travelling, from the depth of the groove of the tread before travelling. Values given by the following equation are shown in Table 3.

(wear loss amount of Reference Example)×100/(wear loss amount of each of the prototype tires)

That is, the higher the value, the better the wear resistance.

Evaluation of Low Heat-Buildup Property

A sample having a length of 20 mm, a width of 4.7 mm and a thickness of 2 mm was prepared for each of the rubber compositions of Examples 1 to 6. A frequency of 50 Hz with a cyclic deflection of 2% was applied to the respective samples using a spectrometer manufactured by Toyo Seiki Co. Ltd., and tan δ at 60° C. of each of the rubber compositions was measured.

Indices are shown with the low heat buildup of the rubber composition of Comparative Example 1 being 100. That is, the higher the value, the better the low heat buildup.

Each of the tires in Examples 7 to 9 was rotated on drums under the high-speed durability test conditions which are specified in American Automobile Safety Standards FMVSS119. Immediately thereafter, a thermistor was inserted into each of the tires at a position on an end of the belt, at which position the thickness of the tread is maximum. Temperature was measured by the thermistor, and values given by the following equation are shown in Table 3.

(temperature of each of the prototype tires)×100/(temperature of the tire in Reference Example)

That is, the lower the value, the better the low heat-buildup property.

Tear Resistance

Elongation at break after heat aging was measured in the following manner. First, square-pole shaped samples, each having a length of 10 mm, a width of 100 mm, and a height of 10 mm, were cut out of each tread of the pneumatic tires. Next, for each of the samples, a slit was formed so as to communicate with one square end surface of the sample and extend to a substantially central portion (in the longitudinal direction of the sample) of the interior of the sample, so as to be parallel to one pair of oppsing rectangular side surfaces and to start from a position separated by 5 mm from each of these opposing rectangular side surfaces. Then, the two portions of the one square end surface, which two portions were separated by the slit, were pulled in opposite directions which were perpendicular to the longitudinal direction of the slit. At this time, stress applied per unit length of cracks formed in the directions of the slit (i.e., resistance against further extension of the cracks) was regarded as tear resistance. The resistance against further extension of the cracks was measured using a strograph.

Indices are shown with the rubber composition used for the tread for the pneumatic tire of Reference Example being 100. Namely, the higher the vale, the better the tear resistance.

TABLE 1

|  | Examples | | | | | | Comparative Examples | | | |
| --- | --- | --- | --- | --- | --- | --- | --- | --- | --- | --- |
|  | 1 | 2 | 3 | 4 | 5 | 6 | 1 | 2 | 3 | 4 |
| Carbon black used | A | B | C | D | E | F | G | H | I | J |
| Natural rubber (parts by weight) | 70 | 70 | 70 | 70 | 70 | 70 | 70 | 70 | 70 | 70 |
| Polybutadiene (parts by weight) | 30 | 30 | 30 | 30 | 30 | 30 | 30 | 30 | 30 | 30 |
| Carbon black (parts by weight) | 50 | 50 | 50 | 50 | 50 | 50 | 50 | 50 | 50 | 50 |
| Index of wear resistance | 114 | 117 | 118 | 123 | 119 | 113 | 100 | 101 | 112 | 96 |
| Index of low heat-buildup property | 127 | 118 | 116 | 111 | 107 | 95 | 100 | 105 | 92 | 112 |

TABLE 2

|  | Examples | | | | | | Comparative Examples | | | |
| --- | --- | --- | --- | --- | --- | --- | --- | --- | --- | --- |
|  | 1 | 2 | 3 | 4 | 5 | 6 | 1 | 2 | 3 | 4 |
| Carbon black used | A | B | C | D | E | F | G | H | I | J |
| DBP | 143 | 169 | 158 | 166 | 159 | 153 | 127 | 148 | 148 | 150 |
| Dw | 111 | 107 | 98 | 105 | 76 | 92 | 65 | 83 | 75 | 129 |
| Dn | 60 | 47 | 48 | 49 | 41 | 47 | 44 | 50 | 47 | 55 |
| Dw/Dn | 1.85 | 2.28 | 2.04 | 2.14 | 1.85 | 1.96 | 1.48 | 1.66 | 1.60 | 2.35 |
| TINT | 109 | 107 | 112 | 110 | 119 | 115 | 131 | 113 | 133 | 95 |
| $0.100 \ast N_2SA + 93$ | 104 | 106 | 107 | 108 | 109 | 110 | 107 | 106 | 110 | 103 |
| $N_2SA$ | 114 | 130 | 136 | 146 | 164 | 172 | 139 | 126 | 166 | 100 |
| IA | 129 | 142 | 145 | 162 | 175 | 186 | 141 | 113 | 176 | 103 |
| $N_2SA/IA$ | 0.88 | 0.91 | 0.94 | 0.90 | 0.94 | 0.92 | 0.99 | 1.12 | 0.94 | 0.97 |
| Dst | 83 | 91 | 60 | 88 | 62 | 91 | 56 | 84 | 53 | 91 |
| $D_{50}$ | 96 | 119 | 136 | 122 | 125 | 88 | 44 | 82 | 45 | 117 |
| $D_{50}/Dst$ | 1.16 | 1.31 | 2.27 | 1.39 | 2.02 | 0.97 | 0.79 | 0.98 | 0.85 | 1.29 |

In Table 1, "Natural rubber" is RSS#1, "Polybutadiene" is BR01, manufactured by JSR Corporation, and "Carbon blacks" A through J are prototypes.

The following is clear from the results of Tables 1 and 2. As in Comparative Example 1, if the DBP absorption is less than 140 ml/100 g, the wear resistance is not sufficient, and the low heat-build up property is not improved. Further, if the ratio (Dw/Dn) is less than 1.80, no improvement in the low heat-buildup property is observed. In Comparative Example 4, whose specific tinting strength (Tint) does not satisfy the inequality (Tint $\geq 0.100 \times$ nitrogen absorption specific surface area $(N_2SA)+93$), the wear resistance decreases.

On the other hand, in the Examples of the present invention, wear resistance and low heat-buildup property, which are the properties antinomic to each other, could both be improved at the same time and could be improved in a well balanced manner. In Example 6, whose ratio ($\Delta D_{50}/$Dst) was less than 1.05, the low heat-buildup property is somewhat lower than other Examples.

TABLE 3

|  |  | Example 7 | Example 8 | Example 9 |
| --- | --- | --- | --- | --- |
| Outline of composition | NR | 70 | 70 | 70 |
|  | BR | 30 | 30 | 30 |
|  | Type of C/B | K | L | M |
|  | C/B phr | 50 | 48 | 50 |
|  | Hydrazide-based compound | 1.0 | 1.0 | 1.0 |
|  | Vulcanization accelerator | 1.5 | 1.5 | 1.5 |
|  | Sulfur | 1.1 | 1.1 | 1.1 |

TABLE 3-continued

|  |  | Example 7 | Example 8 | Example 9 |
| --- | --- | --- | --- | --- |
| Performance | Low heat-buildup property | 108 | 110 | 99 |
|  | Wear resistance | 107 | 103 | 103 |
|  | Tear resistance | 123 | 121 | 119 |
| Remarks |  | Prototype C/B + hydrazide-based compound | Prototype C/B + hydrazide-based compound | Prototype C/B + hydrazide-based compound |

TABLE 4

|  | K | L | M |
| --- | --- | --- | --- |
| $N_2SA$ | 119 | 114 | 146 |
| DBP | 157 | 143 | 166 |
| $\Delta D_{50}/Dst$ | 1.025 | 1.16 | 1.39 |
| IA | 123 | 129 | 162 |
| Dw/Dn | 1.812 | 1.85 | 2.14 |
| TINT | 110 | 109 | 110 |
| $0.1 \ast N_2SA + 93$ | 105 | 104 | 108 |
| $N_2SA/IA$ | 0.97 | 0.88 | 0.90 |

In Table 3, values in the column "Outline of composition" represent values in parts by weight. "NR" represents natural rubber (RSS#1), "BR" represents a butadiene rubber (BR01, manufactured by JSR Corporation), "C/B" represents a carbon black (K, L, and M are prototypes), "phr" represents parts by weight per 100 parts by weight of the rubber component, "hydrazide-based compound"represents 3-hydroxy, N'-(1,3-dimethylbutylidene)-2-naphthoic acid "Vulcanization accelerator" represents N'-cyclohexyl-2-benzodiazothiazylsulfenamide.

From the results of Table 3, it was made clear that, in the case of the treads for the tires of Examples 1 to 3, as compared with Reference Example where a rubber composition containing no hydrazide-based compound was used, the low heat-buildup property and the tear resistance of the vulcanized rubber composition could be improved without impairing the wear resistance.

In accordance with the present invention, various drawbacks in the pirior art can be overcome. Namely, wear resistance and low heat-buildup property, which are the properties antinomic to each other, can both be improved and can be improved in a well balanced manner. Further, the present invention can provide a rubber composition which can be suitably used in various fields such as treads for tires,and a tire in which low heat-buildup property (low fuel consumption) and tear resistance are improved without impairing wear resistance.

What is claimed is:

1. A rubber composition comprising:
  a rubber component selected from the group consisting of at least one of natural rubber and a diene-based syntheric rubber; and
  a carbon black,
  wherein said carbon black has a dibutyl absorption amount (DBP) of 140 to 200 ml/100 g, an aggregate of said carbon black has a ratio (Dw/Dn) of a weight average diameter (Dw) to a number average diameter (Dn) of 1.80 to 2.40, and said carbon black has a specific tinting strength (Tint) and a nitrogen absorption specific surface ares ($N_2SA$) satisfying an inequality; Tint≧0.100× nitrogen aborption specific surface area ($N_2SA$)+93, and
  wherein a ratio ($\Delta D_{50}$/Dst) of a half-width ($\Delta D_{50}$) to a mode (Dst) of the aggregate of said cabon black is in a range of 1.05 to 2.50.

2. The rubber composition or claim 1, wherein said rubber component includes natural rubber and polybutadiene.

3. The rubber composition of claim 1, wherein said rubber component includes 50 to 100% by weight of natural rubber and 0 to 50% by weight of a diene-based synthetic rubber.

4. The rubber composition of claim 1, wherein the dibutyl phthalate absorption amount (DBP) of said carbon black is in a range of 140 to 180 ml/100 g.

5. The rubber composition or claim 1, wherein the ratio (Dw/Dn) of the weight average diameter (Dw) to the number average diameter (Dn) of the aggregate of said carbon black is in a range or 180 to 2.30.

6. The rubber composition or claim 1, wherein the nitrogen absorption specific surface area ($N_2SA$) of said carbon black is in a range of 100 to 180 $m_2$/g.

7. The rubber composition of claim 1, wherein a ratio ($N_2SA$/IA) of the nitrogen absorption specific surface area ($N_2SA$) to an iodine absorption (IA) of said carbon black is in a range or 0.70 to 1.00.

8. The rubber composition of claim 1, wherein the dibutyl phthalate absorption amount (DBP) of said carbon black is in a range of 140 to 180 ml/100 g, the nitrogen absorption specific surface area ($N_2SA$) of said carbon black is in a range of 100 to 170 $m_2$/g, and a ratio ($N_2SA$/IA) of the nitrogen absorption specific surface area ($N_2SA$) to an iodine absorption (IA) of said carbon black is in a range of 0.80 to 1.00.

9. The rubber composition of claim 1, wherein said carbon black is contained in an amount of 30 to 70 parts by weight with respect to 100 parts by weight of said rubber component.

10. The rubber composition of claim 1, containing a of hydrazide-based compound.

11. The rubber composition of claim 1, wherein the hydrazide-based compound is contained in an amount of 0.5 to 2 parts by weight with respect to 100 parts by weight of said rubber component.

12. The rubber composition of claim 1, wherein the hydrazide-based compound is 3-hydroxy-N'-(1,3-dimethylbutylidene)-2-naphthoic acid hydrazide.

13. A tire which has at least a tread, wherein said tread is made of a rubber composition comprising:
  a rubber component selected from at least one of natural rubber and a diene-based synthetic rubber; and
  a carbon black, which has a dibutyl phthalate absorption amount (DBP) or 140 to 200 ml/100 g, whose aggregate has a ratio (Dw/Dn) of a weight average diameter (Dw) to a number average diameter (Dn) of 1.80 to 240, and which has a specific tinting strength (Tint) and a nitrogen absorption specific surface area ($N_2SA$) satisfying an inequality: Tint≧0.100× nitrogen absorption specific surface area $N_2SA$)+93.

* * * * *